United States Patent
Doelker et al.

(10) Patent No.: US 8,140,243 B2
(45) Date of Patent: Mar. 20, 2012

(54) METHOD FOR CONTROLLING A V-TYPE INTERNAL COMBUSTION ENGINE

(75) Inventors: Armin Doelker, Friedrichshafen (DE); Michael Prothmann, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 325 days.

(21) Appl. No.: 12/535,206

(22) Filed: Aug. 4, 2009

(65) Prior Publication Data
US 2010/0030450 A1 Feb. 4, 2010

(30) Foreign Application Priority Data
Aug. 4, 2008 (DE) .................. 10 2008 036 300

(51) Int. Cl.
F02D 41/30 (2006.01)
F02M 31/00 (2006.01)
(52) U.S. Cl. ........................ 701/103; 123/512
(58) Field of Classification Search .......... 123/350, 123/352, 357, 361, 399, 435, 447, 456, 458, 123/467, 472, 478, 480, 486, 488, 512; 701/101, 701/102, 103, 104
See application file for complete search history.

(56) References Cited

U.S. PATENT DOCUMENTS

| | | | | |
|---|---|---|---|---|
| 4,428,341 A * | 1/1984 | Hassler et al. | ................ | 123/350 |
| 4,838,231 A * | 6/1989 | Ganser | ............................ | 123/467 |
| 5,357,929 A * | 10/1994 | McCandless | ................. | 123/446 |
| 5,485,820 A * | 1/1996 | Iwaszkiewicz | ................ | 123/458 |
| 6,397,821 B1 * | 6/2002 | Spagele et al. | ................ | 123/486 |
| 6,807,939 B1 * | 10/2004 | Doelker et al. | ................ | 123/350 |
| 7,072,759 B2 * | 7/2006 | Dolker | ............................ | 701/104 |
| 7,182,064 B2 * | 2/2007 | Dolker et al. | ................. | 123/352 |
| 7,293,556 B2 * | 11/2007 | Baldauf et al. | ................ | 123/681 |
| 7,367,323 B2 * | 5/2008 | Yoshizaki | ...................... | 123/490 |
| 7,856,961 B2 * | 12/2010 | Doelker et al. | ................ | 123/456 |
| 2005/0253394 A1 * | 11/2005 | Dolker et al. | ................. | 290/30 A |
| 2005/0279324 A1 * | 12/2005 | Dolker | ............................ | 123/352 |
| 2007/0142997 A1 * | 6/2007 | Dolker | ............................ | 701/103 |
| 2008/0092852 A1 * | 4/2008 | Bucher et al. | ................. | 123/457 |
| 2009/0223488 A1 * | 9/2009 | Dolker | ............................ | 123/456 |
| 2009/0254262 A1 * | 10/2009 | Kweon et al. | ................. | 701/104 |

FOREIGN PATENT DOCUMENTS

| | | |
|---|---|---|
| DE | 43 35 171 | 5/1995 |
| DE | 195 32 599 | 3/1997 |
| DE | 196 51 671 | 6/1998 |
| DE | 199 37 139 | 4/2001 |
| DE | 103 27 845 | 2/2004 |
| DE | 601 12 681 | 6/2006 |
| DE | 10 2005 060 540 | 4/2007 |

* cited by examiner

*Primary Examiner* — Stephen K Cronin
*Assistant Examiner* — Arnold Castro
(74) *Attorney, Agent, or Firm* — Lucas & Mercanti, LLP; Klaus P. Stoffel

(57) ABSTRACT

A method for controlling a V-type internal combustion engine with a separate common rail system on an A side and a separate common rail system on a B side of the internal combustion engine, in which a set injection quantity is computed at least as a function of an actual speed relative to a set speed. An injection time for controlling an A-side injector is computed by an injector map as a function of the set injection quantity and as a function of an A-side actual rail pressure. The injection time for controlling a B-side injector is computed by the same injector map as a function of the set injection quantity and as a function of a B-side actual rail pressure.

3 Claims, 3 Drawing Sheets

METHOD FOR CONTROLLING A V-TYPE INTERNAL COMBUSTION ENGINE

BACKGROUND OF THE INVENTION

The invention concerns a method for controlling a V-type internal combustion engine with a separate common rail system on an A side and a separate common rail system on a B side.

V-type internal combustion engines have a rail on the A side and on the B side for temporary storage of the fuel. The injectors, which are connected to the rails, inject the fuel into the combustion chambers. In a first design of the common rail system, a high-pressure pump pumps the fuel into both rails at the same time, which is accompanied by an increase in pressure. Therefore, the same rail pressure prevails in both rails. A second design differs from the first in that a first high-pressure pump pumps the fuel into a first rail, and a second high-pressure pump pumps the fuel into a second rail. Therefore, the common rail system on the A side is separate from the common rail system on the B side. Both designs are described, for example, in DE 43 35 171 C1.

DE 199 37 139 C1 describes the determination of the injection time for controlling an injector by means of an efficiency map (injector map) as a function of the actual rail pressure and a set injection quantity. The set injection quantity in turn is computed by a speed controller as a function of the speed control deviation, i.e., the deviation of an actual speed from a set speed.

DE 10 2005 060 540 B3 describes a method of torque-oriented control, in which a set injection quantity is computed by an efficiency map as a function of the actual speed and as a function of a sum torque. The latter is determined by adding a set torque to a friction torque. The set torque in turn is computed by a speed controller as a function of the speed control deviation.

A common feature of the methods described above is their use in a common rail system of the first design, i.e., a common rail system with a single high-pressure pump for the parallel pumping of fuel into the A-side rail and the B-side rail.

SUMMARY OF THE INVENTION

The object of the invention is to provide a concept for determining the injection time in a V-type internal combustion engine with a separate common rail system on an A side and a separate common rail system on a B side.

The invention provides for a different computation of the injection time, depending on whether an injector on the A side or an injector on the B side is to be controlled. The injection time for controlling an A-side injector is computed by an injector map as a function of the set injection quantity and as a function of an A-side actual rail pressure. The injection time for controlling a B-side injector is computed by the same injector map as a function of the set injection quantity and as a function of a B-side actual rail pressure. The set injection quantity is determined, as is already known from the prior art, on the basis of the speed control deviation.

Switching from the A-side actual rail pressure as the input variable of the injector map to the B-side actual rail pressure as the input variable of the injector map or vice versa is carried out as a function of the firing order of the internal combustion engine. In other words, the actual rail pressure that is used to compute the injection time is the one that corresponds to the injector currently to be controlled. Therefore, it is advantageous that, in the case of two separate common rail systems, the injection time of the current injector is correctly computed. The switchability offers the advantage that the method has only a short process cycle. Except for the development of the necessary software, the method can be realized without additional production costs with the available hardware.

The A-side actual rail pressure is computed from the raw values of the A-side rail by means of a filter. The B-side actual rail pressure is determined analogously. More precise adaptation of the method to the current circumstances is realized if the computation of the set injection quantity additionally takes the friction torque into consideration.

DETAILED DESCRIPTION OF THE INVENTION

Figure 1:
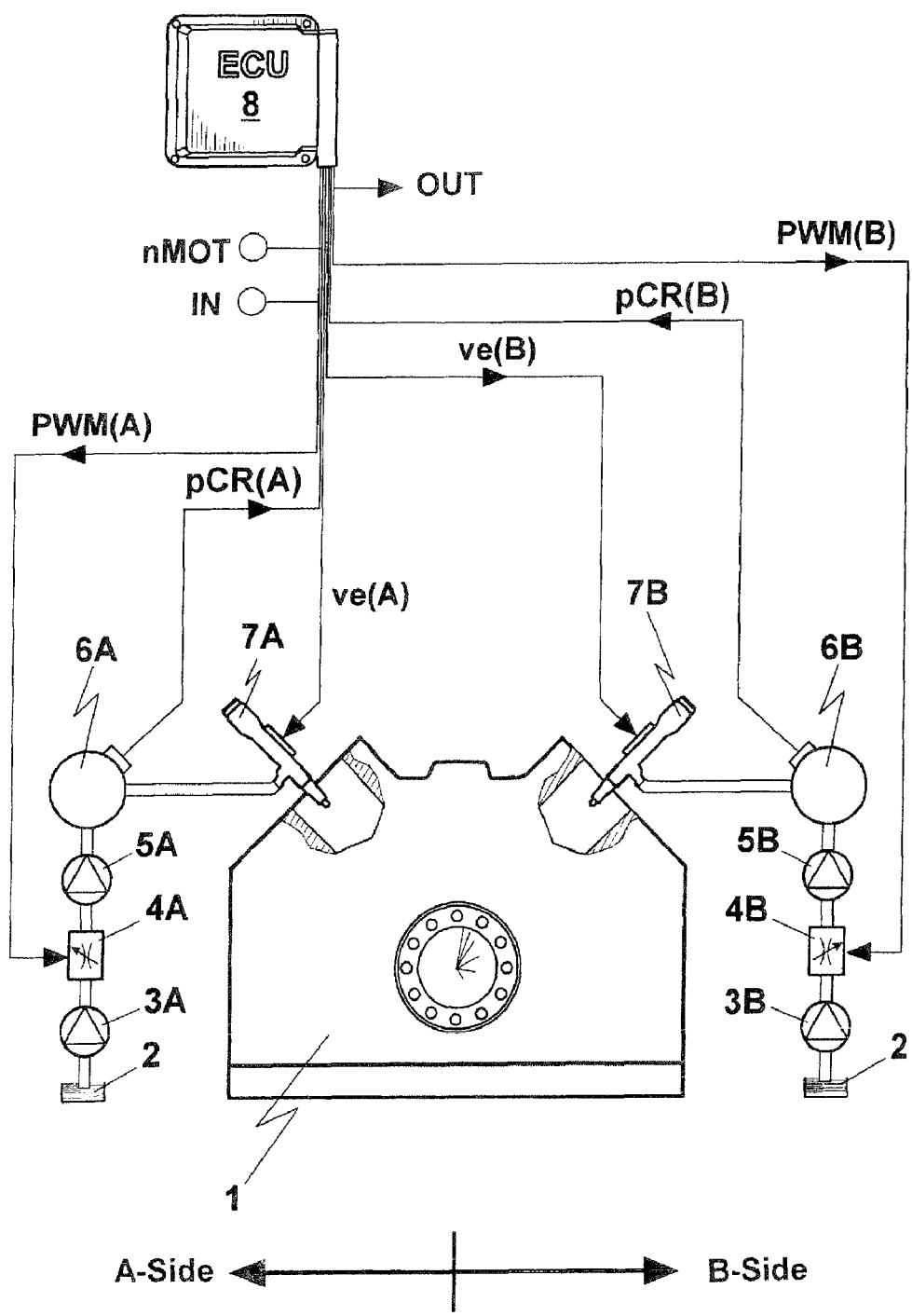
FIG. 1 shows a system diagram.

FIG. 1 shows a system diagram of an electronically controlled internal combustion engine 1 with a separate common rail system on the A side and a separate common rail system on the B side. The common rail system on the A side comprises the following mechanical components: a low-pressure pump 3A for pimping fuel from a tank 2, a suction throttle 4A for controlling the volume flow, a high-pressure pump 5A, a rail 6A, and injectors 7A for injecting fuel into the combustion chambers of the internal combustion engine 1. The common rail system on the B side comprises the same mechanical components, which have the same reference numbers but with the suffix B.

The internal combustion engine 1 is controlled by an electronic engine control unit (ECU) 8. As examples of input variables of the electronic engine control unit 8, FIG. 1 shows an A-side rail pressure pCR(A), a B-side rail pressure pCR(B), the engine speed nMOT, and a variable IN. The variable IN is representative of the other input variables, for example, the oil or fuel temperature and a set speed derived from the power desired by the operator. The illustrated output variables of the electronic engine control unit 8 are a PWM signal PWM(A) for controlling the A-side suction throttle 4A, a power-determining signal ve(A) for controlling the A-side injectors 7A, a PWM signal PWM(B) for controlling the B-side Suction throttle 4B, a power-determining signal ve(B) for controlling the B-side injectors 7B, and a variable OUT. The power-determining signal ve(A) or ve(B) contains the injection start specific to the individual injector and the injection time specific to the individual injector. The variable OUT is representative of the other control signals for controlling the internal combustion engine 1, for example, a control signal for controlling an AGR valve. Naturally the common rail system illustrated here can also be realized as a common rail system with individual accumulators.

Figure 2:
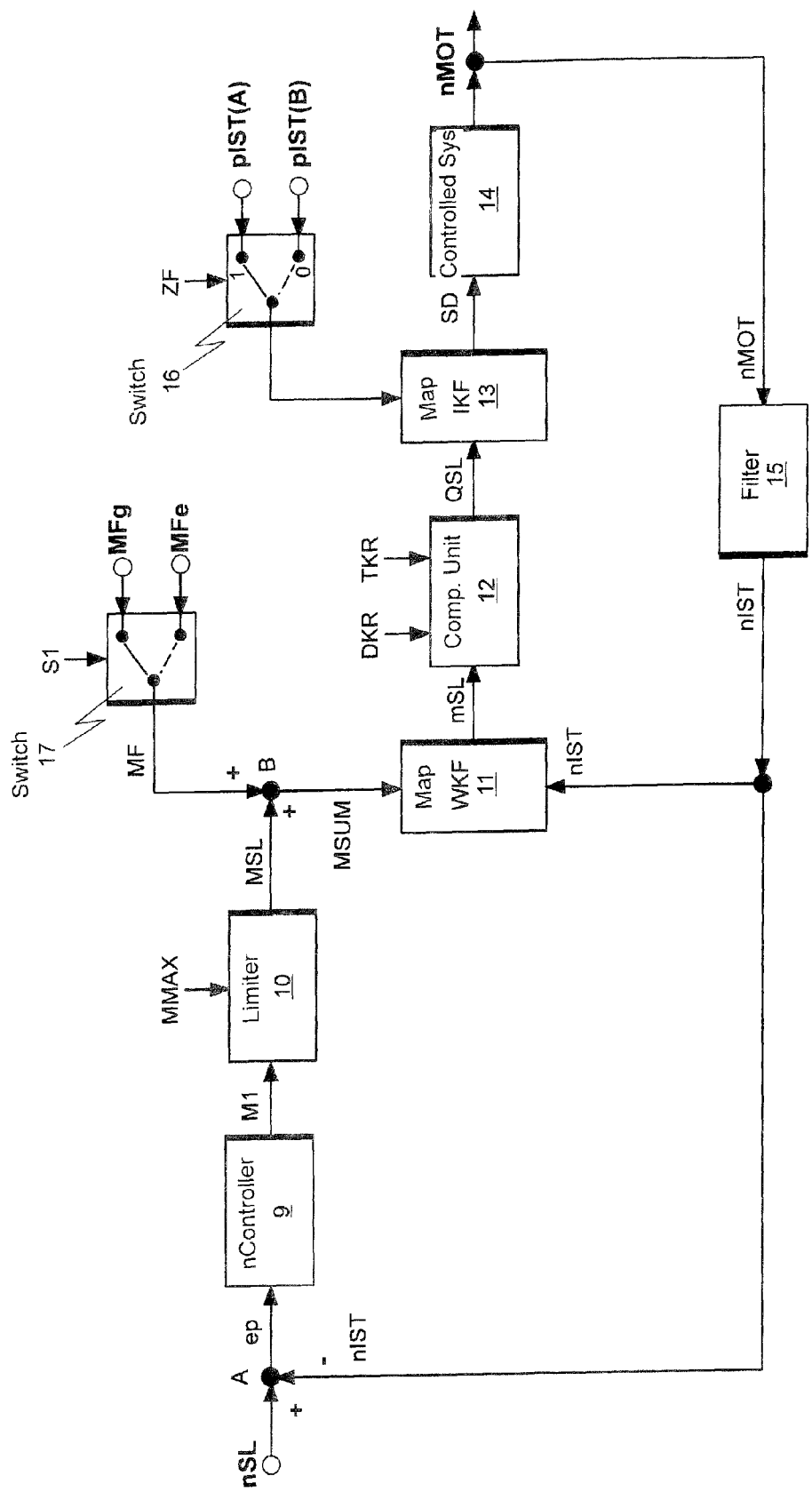
FIG. 2 shows a functional block diagram.

FIG. 2 shows a functional block diagram of a torque-oriented method for controlling the internal combustion engine of FIG. 1. Therefore, the elements in the diagram represent programs, routines or program steps of an executable program. The input variables are the set speed nSL, a friction torque MF, a maximum torque MMAX, a fuel density DKR, a fuel temperature TKR, the firing order ZF, a signal S1, the A-side actual rail pressure pIST(A), and the B-side actual rail pressure pIST(B). The output variable corresponds to the raw values of the engine speed nMOT.

First, the speed control deviation ep is computed at point A from the set speed nSL and the actual speed nIST. The speed controller 9 uses the speed control deviation ep to determine an unlimited set torque M1, which is then limited by a limiter 10 to the maximum torque MMAX. Typically, the maximum torque MMAX is determined from the actual speed nIST, the charge air pressure, and an air mass ratio. The limited set torque MSL is added to the friction torque MF at a point B. The friction torque MF describes the deviation from a friction torque measured under standard conditions. This can be realized either as a total torque MFg or as a cylinder-specific torque MFe. The selection is made by a switch 17 as a function of the signal S1. A corresponding method is described by DE 10 2005 060 540 B3. The result of the addition corresponds to a sum torque MS UM, which represents a first input variable of an engine efficiency map (WKF) 11. The second input variable corresponds to the actual speed nIST. A set fuel mass mSL is computed by the engine efficiency map 11. The set fuel mass mSL is then converted by a computing unit 12 to the set injection quantity QSL as a function of the fuel density DKR, the fuel temperature TKR, and other variables. The set injection quantity QSL is the first input variable of an injector map (IKF) 13. The second input variable is either the A-side actual rail pressure pIST(A) or the B-side actual rail pressure pIST(B). A switch 16 determines whether the A-side actual rail pressure pIST(A) or the B-side actual rail pressure pIST(B) is the determining second input variable. The switch 16 is controlled by the firing order ZF of the internal combustion engine. In this regard, the switching is carried out in such a way that the given actual rail pressure that corresponds to the injector currently to be controlled is the one that is used for computing the injection time SD. If the A-side injector (FIG. 1: 7A) is to be controlled, then the switch 16 occupies position 1. If, on the other hand, the B-side injector (FIG. 1: 7B) is to be controlled, then the switch 16 occupies the position 0. The corresponding injector is then acted upon by the output signal of the injector map 13, i.e., the injection time SD. In FIG. 2, this is shown as the controlled system 14. The output variable of the controlled system 14 corresponds to the raw values of the engine speed NMOT. These values are filtered by a filter 15 and fed back as the actual speed nIST. The closed-loop control system is thus closed.

Figure 3:
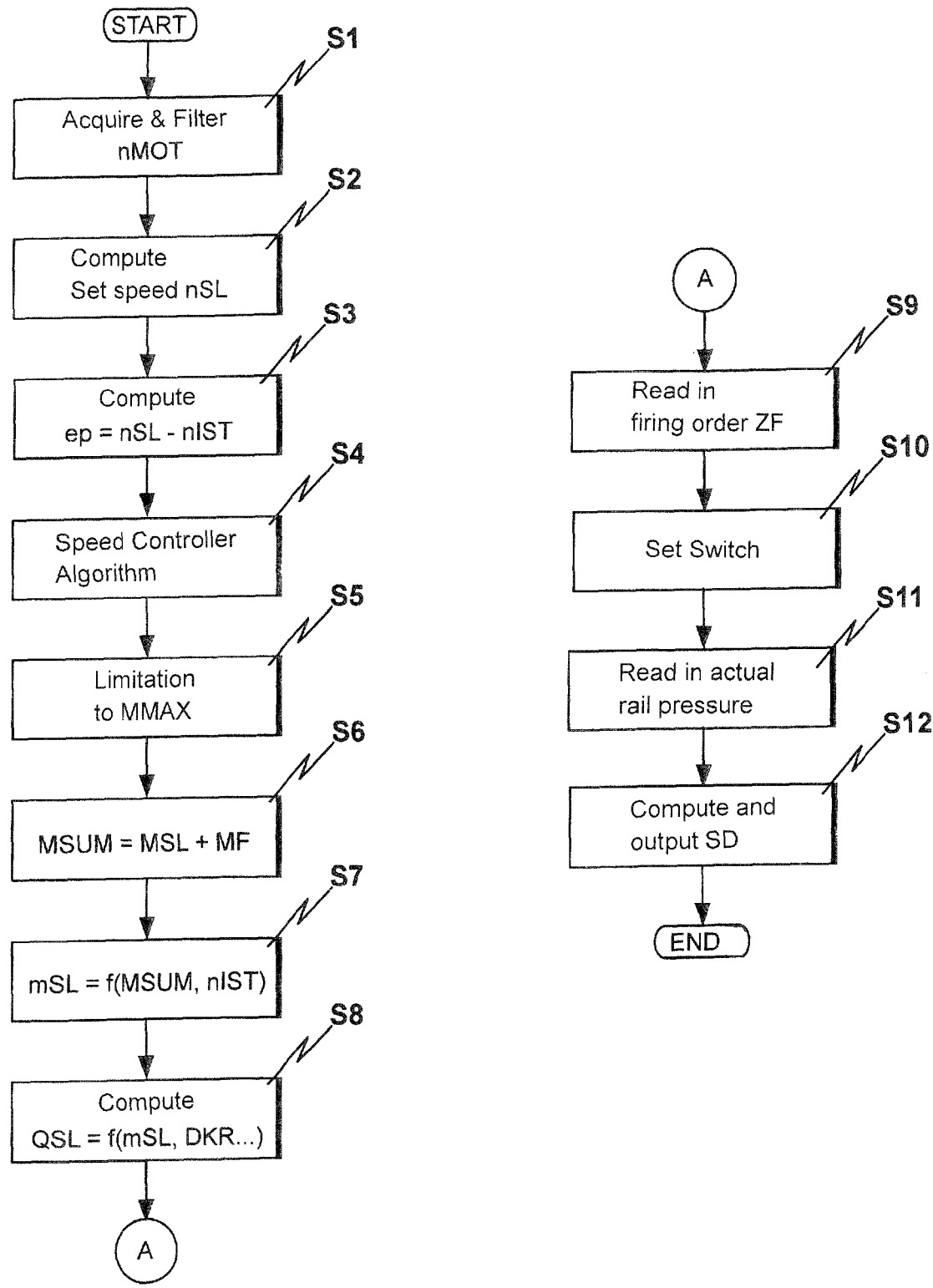
FIG. 3 shows a program flowchart.

In FIG. 3, the method is described in a program flowchart. The computations in steps S1 to S8 are carried out with time synchronization with a scanning time. The computations in steps S9 and S10 are carried out with angular synchronization before each injection operation. At S1 the raw values of the engine speed nMOT are read in, and the actual speed nIST is computed by the filter. At S2 the set speed nSL is computed, for example, on the basis of the power assignment. At S3 the speed control deviation ep is determined from the difference of the set speed nSL and the actual speed nIST. At S4 the speed controller uses its speed controller algorithm, for example, with PIDT1 action, to determine the unlimited set torque M1 from the speed control deviation ep. At S5 the limiter limits the set torque M1 to the maximum torque MMAX. The output signal corresponds to the limited set torque MSL. At S6 the limited set torque MSL and the friction torque MF are then added together. At S7 the set fuel mass mSL is computed by the efficiency map from the sum torque MSUM and the actual speed nIST. At S8 the set injection quantity QSL is determined as a function of the set fuel mass mSL and the properties of the fuel (density, temperature, etc.). At S9 the firing order ZF is read in, and at S10 the switch (FIG. 2: 16) is set accordingly. At S11 the appropriate actual rail pressure, for example, the A-side actual rail pressure pIST (A), is read in. At S12 the injector map uses the set injection quantity QSL and, for example, the A-side actual rail pressure pIST(A) to compute and then output the injection start SD for driving the A-side injector. The program flowchart then ends.

Although the present invention has been described in relation to particular embodiments thereof, many other variations and modifications and other uses will become more apparent to those skilled in the art. It is preferred, therefore, that the present invention be limited not by the specific disclosure herein, but only by the appended claims.

The invention claimed is:

1. A method for controlling a V-type internal combustion engine with a separate common rail system on an A side and a separate common rail system on a B side of the internal combustion engine, comprising the steps of: computing a set injection quantity (QSL) at least as a function of an actual speed (nIST) relative to a set speed (nSL), computing an injection time (SD) for controlling an A-side injector by an injector map as a function of the set injection quantity (QSL) and as a function of an A-side actual rail pressure (pIST(A)); and computing an injection time (SD) for controlling a B-side injector by the same injector map as a function of the set injection quantity (QSL) and as a function of a B-side actual rail pressure (pIST(B)), including switching from the A-side actual rail pressure (pIST(A)) as an input variable of the injector map to the B-side actual rail pressure (pIST(B)) as the input variable of the injector map or vice versa as a function of firing order (ZF).

2. The method in accordance with claim 1 including computing the A-side actual rail pressure (pISTA(A)) from raw values (pCR(A)) of the A-side rail using a filter, and computing the B-side actual rail pressure (pIST(B)) from raw values (pCR(B)) of the B-side rail using a filter.

3. The method in accordance with claim 1, further including computing the set injection quantity (QSL) as a function of a friction torque (MF), where the friction torque (MF) is predetermined either as a total torque (MFg) or as a cylinder-specific torque (MFe).

* * * * *